Figure 1:
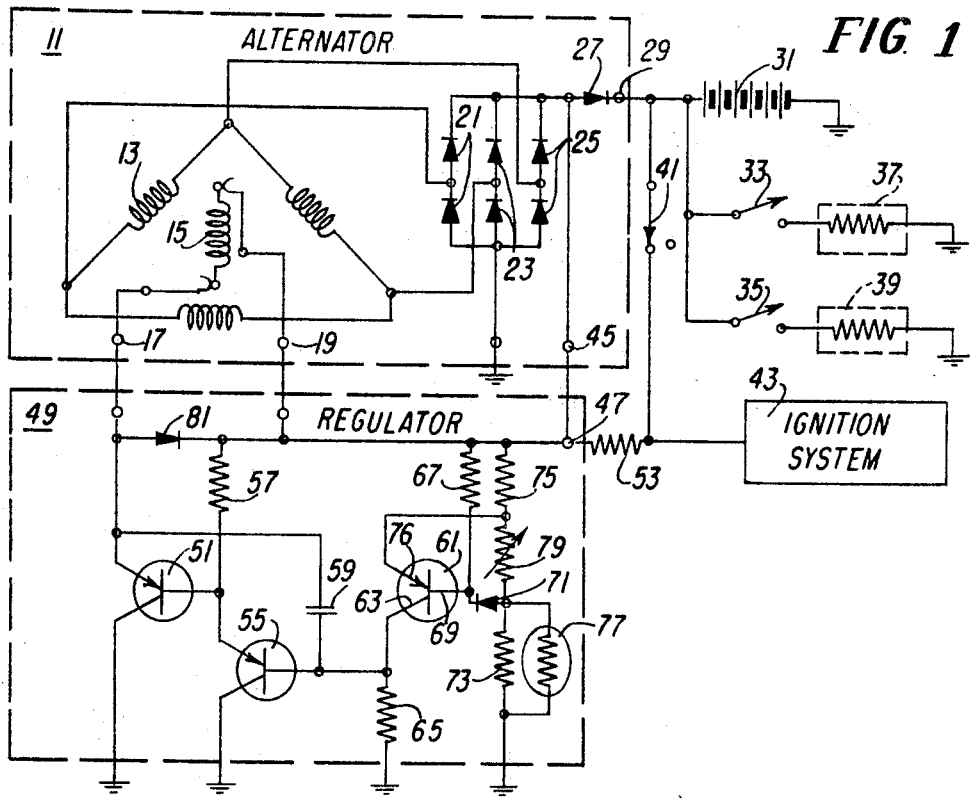

Sept. 13, 1966  C. L. SHANO  3,273,049

VOLTAGE REGULATOR

Filed Feb. 14, 1963

INVENTOR.
CHARLES L. SHANO
BY
Mueller & Aichele
ATTYS.

United States Patent Office 3,273,049
Patented Sept. 13, 1966

3,273,049
VOLTAGE REGULATOR
Charles L. Shano, Morton Grove, Ill., assignor to Motorola, Inc., Franklin Park, Ill., a corporation of Illinois
Filed Feb. 14, 1963, Ser. No. 258,404
6 Claims. (Cl. 322—28)

This invention relates to voltage regulators, and more particularly to an electronic regulator of the type for controlling the output of an electromechanical source of direct current.

In present transistorized electronic voltage regulators of the type generally used in vehicular electrical system, high ambient temperature may affect the operation thereof. This is because the parameters of the semiconductors used in the circuitry are susceptible to variation with operating temperature changes. In addition, because semiconductor devices may be damaged by high transient voltages, complex bias circuits including numerous diodes have heretofore often been used in the circuitry to protect the transistors. Moreover, it may be desirable from a mechanical standpoint, for optimum heat dissipation, for the circuitry to be connected with a positive ground. A single device, capable of use with both positive and negative ground electrical systems is highly desirable from a manufacturer's cost standpoint. Finally, voltage regulators incorporating semiconductor devices are often of poor overall stability.

Accordingly, an object of the invention is to provide a voltage regulator of improved overall stability for use with a vehicular electrical system.

Another object of the invention is to provide a low cost voltage regulator capable of satisfactory operation even at high ambient temperatures, and which is suitable for both positive and negative ground systems without extensive modification.

Another object of the invention is to provide a voltage regulator wherein the requirements for protective elements and circuitry are minimized.

A feature of the invention is the provision of a voltage regulator having output and input transistor stages and an emitter loaded transistor stage coupling the two with the input transistor stage having a bias network providing reverse bias voltage when the forward biasing of the transistor is removed.

Another feature of the invention is the provision of a voltage regulator having a control transistor with a resistor connecting the emitter thereof to the source of voltage to be regulated for reverse biasing the transistor when it is not conductive, and for providing a voltage drop less than the base emitter potential difference when the transistor is conductive.

Still another feature of the invention is the provision, in a vehicular electrical system having an electromechanical source of direct current with a field winding therein, of a three transistor voltage regulator having an emitter loaded middle stage and a grounded collector switch transistor connected in the field circuit.

Figure 2:
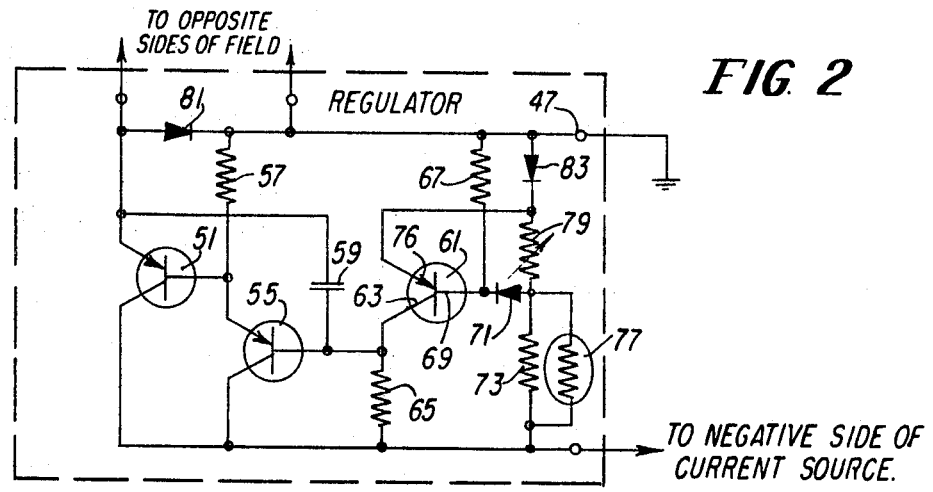

In the drawings:
FIG. 1 is a schematic diagram of a vehicular electrical system utilizing a voltage regulator constructed in accordance with the invention; and
FIG. 2 is a schematic diagram of an alternate version of the regulator circuit of FIG. 1.

In practicing the invention, a voltage regulator is provided with a grounded collector switch transistor connected to the field winding of an alternator or generator. Conduction of the switch transistor, and hence energization of the field winding, occurs due to forward bias applied to the switch transistor by the conduction of an emitter loaded coupling transistor. When the coupling transistor is cut off, the switch transistor will also be cut off to remove field current. Conduction of the coupling transistor is controlled by a control transistor which is normally cut off. The emitter electrode of the control transistor is connected through a first voltage dropping element to the voltage source. The base electrode of the control transistor is also connected to the voltage source through a second voltage dropping element. With no current flowing through the second element, the first element serves to reverse bias the control transistor. A variable resistor and a zener diode are connected in stated order from the emitter electrode to the base electrode of the control transistor to form a portion of a voltage divider network. The juncture of these two series elements is coupled through a resistance to ground to complete the network. When the voltage across the zener diode reaches the predetermined value responsive to the voltage source, the zener diode breaks down causing conduction through the base resistor. The voltage divider network is constructed so that the voltage drop across the second element renders the control transistor conductive. This places cut off current on the coupling transistor and hence cuts off the switch transistor to remove the field current.

In FIG. 1, an alternator 11 is illustrated having a delta connected armature 13 with a rotating field winding 15. Field 15 is connected through the usual slip rings and brushes to a pair of terminals 17 and 19. The corners of the delta connected armature 13 are connected respectively to diode pairs 21, 23 and 25, and the rectified output therefrom is coupled through an isolation diode 27 to terminal 29.

Terminal 29 is connected to a storage battery 31 to provide charging current thereto. Storage battery 31 may be connected to the various load elements of the automobile as represented by switches 33 and 35 connected to resistors 37 and 39 respectively; and through ignition switch 41 to the ignition system 43 for the internal combustion enigne of the automobile (not shown). The rectified output of the alternator is also taken from just ahead of isolation diode 27 and connected to output terminal 45. Terminal 45 is connected to the input terminal 47 of a voltage regulator 49. The rectified alternator output from terminal 47 is applied to the field winding 15 of the alternator 11 at terminal 19. The circuit through field winding 15 is completed through terminal 17 to ground by a grounded collector switch transistor 51. An indicator light or gauge represented by resistor 53 may be connected in series with the storage battery to indicate the presence of charging currents.

Switch transistor 51 is controlled by emitter loaded coupling transistor 55. Stabilizing resistor 57 connects the emitter electrode of transistor 55 and the base electrode of transistor 51 to input terminal 47. When transistor 55 is conductive, the base of transistor 51 will be essentially at ground causing transistor 51 to conduct heavily, thereby energizing field 15. When transistor 55 is rendered non-conductive, as will be explained subsequently, transistor 51 will be cut off rapidly due to the regenerative effect of capacitor 59 connected from the base electrode of transistor 55 to the emitter electrode of transistor 51. Cut off of transistor 51 will remove the current from field 15 of alternator 11, with a consequent reduction of output at terminals 29 and 45.

The conduction of transistor 55 is determined by a control transistor 61, and the stabiilty of the switching action of this transistor is critical to the stability of the enire regulator. Collector 63 of transistor 61 is connected to the base of transistor 55 and is grounded through a resistor 65. A bias network for transistor 61 includes a resistor 67 connecting the base 69 of transistor 61 to the terminal 47. A zener diode 71 in series with a resistor 73 from base 69 to ground, and a resistor 75 connecting the emitter 76 of transistor 61 to terminal 47, complete the bias network for transistor 61. A thermistor 77 is connected in parallel with resistor 73 to provide temperature compensation for diode 71 by effectively lowering the voltage at which diode 71 breaks down as temperature increases. Transistor 61 can therefore operate at less current.

Diode 71 is connected for reverse conduction from resistor 67 to ground, and consequently transistor 61 will not be forward biased until the voltage across diode 71 exceeds its breakdown level. The voltage thereacross may be further regulated by a variable resistor 79 connected in series between resistor 75 and resistor 73. When the bias circuit is properly set, zener diode 71 will sense the maximum allowable output of alternator 11 and will break down at that point into reverse conduction. Resistor 79 is adjusted so that the drop across resistor 67 is greater than the drop across resistor 75 when diode 71 breaks down. Transistor 61 will therefore be forward biased to conduct through resistor 65. This raises the voltage at the base of transistor 55 to cut that transistor off, thereby cutting off transistor 51 and removing current from field 15. Once the alternator output voltage drops to safe levels, zener diode 71 will again block the bias circuit for transistor 61. Because resistor 67 is connected to the positive side of resistor 75, reverse bias is applied to transistor 61 for stable switching action.

In addition to the apparent effect of the varying field current in determining the rapidity of the switching action of zener diode 71, there are two other factors which, in combination with the varying field current, contribute to overall stability in the regulator. The first of these is what might be termed "voltage slump." When diode 71 initially breaks down at the beginning of its very rapid switching cycle, current starts flowing through resistor 67. Unless the output voltage of the regulator has built up in that brief instant to a level sufficient to overcome the drop across resistor 67, diode 71 will quickly stop reverse conduction. Thus an even shorter on time will elapse before transistor 61 is cut off, allowing the field current more time to build up. The second factor is the relationship of the voltage drops across resistors 67 and 75. Proper relationship between these two resistors and the other components in the bias network will not only determine the effect of "voltage slump," but will determine the extent to which transistor 61 is forward and reverse biased. Ideally, resistor 67 should be as low as possible to still supply forward bias to transistor 61 when diode 71 is in reverse conduction. This will minimize the effect of leakage currents when transistor 61 is cut off, improving transistor stability. All these factors, working together, aid in maintaining a very stable output voltage.

The voltage output of the alternator alternately switches above and below the maximum as the voltage across zener diode 71 alternately exceeds and goes below the breakdown level of the diode. This occurs so rapidly that a relatively stable output voltage results. As an additional precaution, diode 81 may be added across the field 15 to absorb switching transients, although it is not necessarily required.

Referring now to FIG. 2, an alternative circuit is shown. This embodiment is suitable for positive ground systems, and is virtually identical with the regulator of FIG. 1, save for the fact that terminals are reversed. In other words, by connecting the ground terminals of the regulator of FIG. 1 to the minus side of the electrical current source, and the terminal 47 to ground, the regulator is operable in a positive ground system.

A further modification is shown in FIG. 2. Resistor 75 may be replaced by a diode 83. Diode 83 insures a constant voltage drop for transistor 61 and consequently variations in the amount of leakage current through resistors 79 and 73 and thermistor 77, will not cause undesired variation in the bias circuit.

It may therefore be seen that the invention provides a voltage regulator with improved overall stability even at high ambient temperatures. Base emitter phase shift is of no effect since the three transistor systems insures proper phase relationships. The regulator may be adapted to positive ground systems with very little modification of the circuitry. Finally, excellent stability is attained without unduly complex biasing networks.

What is claimed is:

1. A voltage regulator for a vehicular electrical system having an electromechanical source of direct current with a field winding therein, said source of direct current being connected to a reference potential and providing an output voltage with respect thereto, said regulator including in cobination, means for connecting one end of the field winding to the source of direct current, a first transistor having an emitter electrode connected to the other end of the field winding and a collector electrode connected to the reference potential to complete an energizing circuit for the field winding, an emitter loaded second transistor coupled to said first transistor to cut off same when said second transistor is cut off, and a third transistor coupled to said second transistor and conductive to provide cut off bias thereto, said third transistor having base, emitter and collector electrodes, a first resistor for connecting said emitter electrode of said third transistor to the source of direct current, a second resistor for connecting said base electrode of said third transistor to the source of direct current, a zener diode connected between said base electrode of said third transistor and the reference potential, said zener diode being poled to conduct in reverse direction from said base electrode to the reference potential, a third resistor coupling said emitter electrode of said third transistor to the reference potential so that when said zener diode is not broken down said first resistor will reverse bias said third transistor, and so that when said zener diode is broken down for reverse conduction said third transistor will be forward biased.

2. A voltage regulator for a vehicular electrical system having an electromechanical source of direct current having first and second terminals of opposite polarity and further having a field winding therein, said regulator including in combination, means for connecting said field winding across terminals of the source of direct current and including a first transistor having an emitter electrode connected to the field winding and a collector electrode connected to the first terminal of the source of direct current to complete an energizing circuit for the field winding, an emitter loaded second transistor coupled to said first transistor to cut off same when said second transistor is cut off, and a third transistor coupled to said second transistor and conductive to provide cut off bias thereto, said third transistor having base, emitter and collector electrodes, first voltage dropping means connecting said emitter electrode of said third transistor to the second terminal of the source of direct current, second voltage dropping means connecting said base electrode of said third transistor to the second terminal of the source of direct current, conductor means including a zener diode connecting the base electrode of said third transistor to the first terminal of the source of direct current, said zener diode being poled to conduct in reverse direction from the second terminal to the first terminal, third voltage dropping means coupling said emitter electrode of said third transistor to the first terminal of the source of direct current so that when said zener diode is not broken down said first voltage dropping means will reverse bias said third transistor and so that when said zener diode is broken down for reverse conduction said third transistor will be forward biased.

3. In a vehicular electrical system having an electromechanical source of direct current with a field winding therein, said source of direct current being connected to a reference potential and providing an output voltage with respect thereto, a voltage regulator including in combination, circuit means for connecting the field winding to the source of direct current, a first transistor having emitter and collector electrodes connected to complete a circuit path from the field winding to the reference potential, an emitter loaded second transistor coupled to said first transistor for cutting off the same to regulate the output of the electromechanical source, a third transistor coupled to said second tarnsistor for cutting off the same when rendered conductive, said third transistor including base, emitter and collector electrodes, a first resistor connecting said emitter electrode of said third transistor to the source of direct current, a second resistor connecting the base of said third transistor to the source of direct current, a variable resistor and a zener diode connected in series in stated order between said emitter electrode and said base electrode of said third transistor, resistance means connecting the juncture between said zener diode and said variable resistor to the reference potential to complete a parallel path from the source of direct current through said first resistor and said variable resistance and through said second resistor and said zener diode respectively, said zener diode being poled to conduct in the reverse direction from said second resistor to said resistance means, said zener diode being responsive to a predetermined voltage thereacross to breakdown and cause conduction through said second resistor, whereby the voltage drop across said second resistor will be greater than the voltage drop across said first resistor, thereby formed biasing said third transistor, and whereby when said zener diode is not broken down, said first resistor will serve to reverse bias said third transistor.

4. In a vehicular electrical system having a electromechanical source of negative direct current with a field winding therein, said source of negative direct current being connected to a reference potential and providing an output voltage which is negative with respect thereto, a voltage regulator including in combination, circuit means for connecting the field winding to the reference potential, a first transistor having emitter and collector electrodes connected to complete a circuit path from the field winding to the source of direct current, an emitter loaded second transistor coupled to said first transistor for cutting off the same to regulate the output of the electromechanical source, a third transistor coupled to said second transistor for cutting off the same when rendered conductive, said third transistor including base, emitter and collector electrodes, a first resistor connecting said emitter electrode of said third transistor to the reference potential, a second resistor connecting the base of said third transistor to the reference potential, a variable resistor and a zener diode connected in series in stated order between said emitter electrode and said base electrode of said third transistor, resistance means connecting the juncture between said zener diode and said variable resistor to the source of direct current to complete a parallel path from the reference potential through said first resistor and said variable resistance and through said second resistor and said zener diode respectively, said zener diode being poled to conduct in the reverse direction from said resistance means to said second resistor, said zener diode being responsive to a predetermined voltage thereacross to breakdown and cause conduction through said second resistor, whereby the voltage drop across said second resistor will be greater than the voltage drop across said first resistor, thereby forward biasing said third transistor, and whereby when said zener diode is not broken down, said first resistor will serve to reverse bias said third transistor.

5. The combination of claim 2 wherein said first voltage dropping means comprises a diode.

6. The combination of claim 2 wherein said conductor means further includes temperature sensitive resistor means for providing ambient temperature compensation.

References Cited by the Examiner
UNITED STATES PATENTS 2,841,757 7/1958 Shields _____ 323—22
3,098,964 7/1963 Hetzler _____ 322—28

JOHN F. COUCH, *Primary Examiner.*

LLOYD McCOLLUM, *Examiner.*

A. H. TISCHER, W. H. BEHA, *Assistant Examiners.*